United States Patent
Mugnier et al.

(10) Patent No.: US 8,424,378 B2
(45) Date of Patent: Apr. 23, 2013

(54) WIND SENSOR WITH THRESHOLD FOR EACH GROUP

(75) Inventors: Mickael Mugnier, Bonneville (FR); Cyrille Nguyen Van, Annecy (FR); Jean-Christophe Deshayes, Saint Pierre en Faucigny (FR)

(73) Assignee: SOMFY SAS, Cluses (FR)

( * ) Notice: Subject to any disclaimer, the term of this patent is extended or adjusted under 35 U.S.C. 154(b) by 316 days.

(21) Appl. No.: 12/822,779

(22) Filed: Jun. 24, 2010

(65) Prior Publication Data

US 2010/0326184 A1 Dec. 30, 2010

(30) Foreign Application Priority Data

Jun. 26, 2009 (FR) ...................................... 09 54385

(51) Int. Cl.
*A63B 53/00* (2006.01)
(52) U.S. Cl.
USPC ...................................................... 73/170.01
(58) Field of Classification Search ............... 73/170.01, 73/781; 700/275; 290/44
See application file for complete search history.

(56) References Cited

U.S. PATENT DOCUMENTS

| 5,225,748 A | 7/1993 | Haring |
| 6,484,069 B2 * | 11/2002 | Osinga ........................ 700/275 |
| 6,744,372 B1 * | 6/2004 | Shaw et al. .................... 340/685 |
| 2003/0069670 A1 | 4/2003 | Osinga |
| 2007/0013194 A1 * | 1/2007 | Calley ............................ 290/44 |

FOREIGN PATENT DOCUMENTS

| EP | 1054134 A | 11/2000 |
| EP | 0771929 B | 10/2001 |
| EP | 1939373 A | 7/2008 |
| FR | 2888868 A | 1/2007 |
| WO | WO 2005/038187 A | 4/2005 |

OTHER PUBLICATIONS

Search Report issued by French Patent Office for priority application FR 09 54385 dated May 19, 2010.

* cited by examiner

*Primary Examiner* — Jewel V Thompson
(74) *Attorney, Agent, or Firm* — Frommer Lawrence & Haug LLP; Ronald R Santucci

(57) ABSTRACT

Wind safety sensor, comprising a physical device for measuring at least one parameter associated with the action of the wind, comprising a bidirectional radiofrequency communication means, capable of transmitting a signal to at least one mobile home automation element when the parameter exceeds a threshold, comprising an assignment table for at least one first threshold and one second threshold relating to distinct types of mobile home automation elements and such that the transmitted signal comprises an identifier of the type for which the threshold has been exceeded, a code controlling a safety action and/or an identifier of the safety sensor. Home automation installation comprising such a sensor and control device for such a home automation installation.

11 Claims, 3 Drawing Sheets

| | Predefined | Installer |
|---|---|---|
| Predefined | Case C3 | Case C1 |
| Installer | Case C4 | Case C2 |

Threshold → (rows), Group → (columns)

| Type 1 (EVB) | TH1a | CMD (HOR) |
|---|---|---|
| | TH1b | CMD (UP) |
| Type 2 (SCR) | TH2 | CMD (UP) |
| Type 3 (AWN) | TH3 | CMD (UP) |

41

51  52  53

WIND SENSOR WITH THRESHOLD FOR EACH GROUP

This application claims priority benefits from French Patent Application Number 09 54385 filed Jun. 26, 2009, the disclosure of which is incorporated herein by reference.

BACKGROUND OF THE INVENTION

The invention relates to a wind safety sensor, designed to protect mobile home automation elements. These elements are generally installed on one or more facades of a building.

DESCRIPTION OF THE PRIOR ART

Numerous documents from the prior art describe such sensors or installations comprising these safety sensors.

The U.S. Pat. No. 5,225,748 describes an anemometer and a logic unit comprising a number of wind speed measurement comparison thresholds for securely controlling the position of a motorized blind. Depending on the measured value, the position of the blind is determined: two intermediate positions are thus defined, making it possible to benefit from as much solar protection as the wind permits.

The patent EP 0 771 929 describes an energy-independent wind sensor for a blind. A withdrawal signal is transmitted if the measured wind speed exceeds a threshold.

The patent application FR 2 888 868 also describes an energy-independent home automation sensor. The transmission of a signal, containing the value of the measured physical quantity, takes place only if said quantity varies by a given amount within a given time interval or since the preceding transmission.

The patent application WO 2005/038187 describes an installation comprising a number of motorized mobile elements (solar protection elements). Each element is provided with its own device for measuring wind effects, for example an accelerometer. Furthermore, at least one wind speed measuring device is placed in the environment of the motorized solar protection elements. In an initialization mode, the following can be stored for a mobile element:
 a wind effects threshold value, or safety threshold, making it possible to confirm, when the measurement of the wind effects is greater than this threshold value, a withdrawal action for the mobile element,
 a first wind speed threshold value making it possible to confirm, when the wind speed is below this threshold value, a deployment action for the mobile element.

The wind effects threshold value and the first wind speed threshold value therefore correspond to opposing actions of the mobile element.

These threshold values can be stored in a memory of a control unit, for the wind speed measuring device or in each mobile element.

In this document, a correlation is sought between the measured wind effects values and the wind speed value at a given instant to define a second wind speed threshold value corresponding to the safety threshold. Thus, mobile elements characterized, for example, by one and the same safety threshold relating to the wind effects, will give rise to different values for the second wind speed threshold value.

A third wind speed threshold value can be deduced from the second threshold value to confirm a withdrawal action of the mobile element. The result of this is that withdrawal actions of mobile elements of the same type will be provoked by different wind speed values.

According to this patent application, the wind effects threshold values can be chosen to be identical for the motorized devices of the same type or for the devices installed on one and the same facade. However, each device is nevertheless assigned a wind effects threshold value (safety value) and at least the first wind speed threshold value corresponding to confirmation of the deployment. This storage takes place in an initialization step of a learning method and the result is a significant waste of time for the installer, even if he chooses to assign identical threshold values from one product to another.

The patent application EP 1 939 373 describes the automatic learning of a vibration threshold, by using the measurement given by an accelerometer arranged on a motorized moving screen when said screen is manually agitated.

SUMMARY OF THE INVENTION

The invention seeks to address various objectives to improve the devices of the prior art.

It has become essential to simplify as far as possible the installation and adjustment procedures for solar protection devices in order to avoid adding a high installation cost to the costs of the equipment and in order to minimize the risks of error. The use of clear and unambiguous display means should simplify and secure the safety sensor setting procedure, while making it possible nevertheless to take account of different wind sensitivities of the different types of solar protection equipment.

Furthermore, the increase in radio traffic associated with the increasing use of controlled or remotely-communicating devices makes it essential to minimize the quantity of commands transmitted and all the more so when safety commands are involved.

In particular, it is important for a safety sensor to itself communicate, in the most direct and simple manner possible, and simultaneously, with all the devices affected by a safety command, particularly without there being a need to involve a supervisory device such as a control central unit to process the safety commands. A delay of a few seconds in a withdrawal command may in fact result in the destruction or degradation of a mobile solar protection element.

According to the invention, the wind safety sensor, designed to protect mobile home automation elements, comprises a physical device for measuring at least one parameter associated with the action of the wind, a radiofrequency communication means, is capable of transmitting a signal when the parameter exceeds a threshold, it comprises an assignment table for at least one first threshold and one second threshold relating to distinct types of mobile home automation elements and the transmitted signal comprises an identifier of the type for which the threshold has been exceeded, and an information selected from the group consisting of a code controlling a safety action and an identifier of the safety sensor and combinations thereof.

According to the invention, the type identifier can take at least one first predefined value, relating to a mobile home automation element of the type with orientable and stackable slats, a second predefined value, relating to a mobile home automation element of the windable screen type with vertical movement, and a third predefined value, relating to a mobile home automation element of the windable blind type with horizontal movement component.

According to the invention, the assignment table can comprise at least one sublevel for assigning distinct control codes to distinct thresholds, for one and the same type of mobile home automation elements.

According to the invention, the communication means can be bidirectional.

According to the invention, the wind safety sensor can comprise a program for updating the assignment table and one and the same default threshold can be assigned to all the types of mobile home automation elements until a first update has been made.

According to the invention, the wind safety sensor can comprise a manual threshold adjustment means and one and the same threshold set by this manual adjustment means can be assigned to all the types of mobile home automation elements when it is activated.

According to the invention, the wind safety sensor can comprise a standalone power supply means such as a primary battery or an accumulator battery recharged by a photovoltaic panel.

According to the invention, the home automation installation comprises at least one wind safety sensor, at least one home automation device, connected to the AC mains, and this home automation device comprises a bidirectional radiofrequency communication means and a buffer memory capable of containing assignment table threshold values, transmitted to the safety sensor when interrogated by the safety sensor.

According to the invention, the threshold values can be adjusted and stored in the buffer memory using a human-machine interface of a control device of the installation.

According to the invention, the home automation installation can comprise actuators driving mobile elements, each actuator being provided with bidirectional communication means and able to receive and execute:
- a command to pair with the safety sensor
- a command to store a type identifier
- a movement command containing the identifier of the actuator
- a movement command containing the type identifier.

According to the invention, the control device for a home automation installation comprises a wind safety sensor as described hereinabove and a human-machine interface means able to differentiate at least one first setting relating to a mobile home automation element of the type with orientable and stackable slats, a second setting relating to a mobile home automation element of the windable screen type with vertical movement, and a third setting relating to a mobile home automation element of the windable blind type with horizontal movement component.

BRIEF DESCRIPTION OF THE DRAWINGS

The invention will be better understood by those skilled in the art from the detailed description of the different embodiments in conjunction with the accompanying drawings, in which.

DESCRIPTION OF THE PREFERRED EMBODIMENTS

Figure 1:
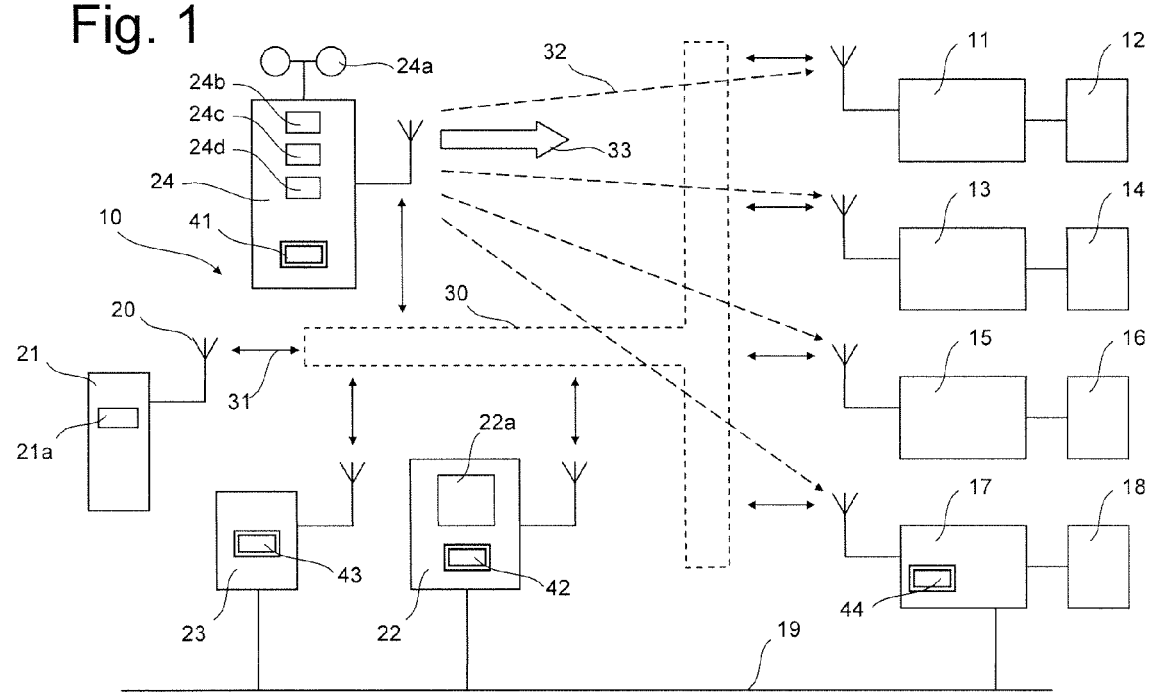
FIG. 1 describes a home automation installation according to the invention, comprising a wind safety sensor, control devices and actuators driving mobile solar protection elements.

FIG. 1 diagrammatically describes a home automation installation 10 according to the invention, comprising a wind safety sensor, control devices and actuators driving mobile solar protection elements. Four actuators are shown, but the invention becomes all the more interesting when it is applied to a large number of actuators and mobile elements in one and the same installation.

The installation comprises a first actuator 11 connected to a first mobile solar protection element 12, a second actuator 13 connected to a second mobile solar protection element 14, a third actuator 15 connected to a third mobile solar protection element 16, and a fourth actuator 17 connected to a fourth mobile solar protection element 18.

The actuators are connected to the electrical mains 19 so as to be supplied with power, as represented for the fourth actuator. Some actuators may be energy-independent. Each actuator drives the mobile element to which it is connected, in a deployment direction or in a withdrawal direction. The mobile elements are arranged on one more facades of the building.

Within the home automation installation, the communication between the control devices and the actuators is handled by radiofrequency means, represented by the symbol of an antenna 20. A first control device 21 comprises in particular a first human-machine interface 21a, for example a small keyboard and screen. With this interface, a user can define control commands which will be sent to one or more actuators. With this interface, an installer can also adjust wind thresholds, as will be described in conjunction with FIG. 5. The first control device is of mobile type, powered by primary batteries.

A second control device 22 is connected to the electrical mains. It comprises a second human-machine interface, for example a large touch screen. Alternatively, the second control device comprises a standalone power supply means enabling it to be active permanently, at least with regard to listening for radio messages.

The installation also comprises a relay device 23, or mailbox, that can be likened to a control device because it is able, for example, to broadcast, to a standalone device that is periodically set to sleep mode, information and in particular commands received from a mobile control device at a moment when the standalone device is asleep.

Advantageously, the relay device may be contained in an actuator connected to the mains, for example the fourth actuator.

The installation also comprises at least one wind safety sensor 24. This sensor comprises a physical means for measuring at least one parameter associated with the action of the wind, represented by the symbol of an anemometer 24a (the physical measuring means possibly comprising an anemometer or, for example, a known pressure or stress or cooling measuring device) and comprises, like the other elements of the installation, a bidirectional radiofrequency communication means, represented by the symbol of an antenna. It comprises a comparison means 24b that can trigger the transmission of a signal, using the radiofrequency means, when the parameter exceeds a threshold.

The sensor finally comprises a manual means 24c for adjusting the threshold.

All the devices use one and the same communication protocol enabling a home automation network 30 to be defined that is specific to the home automation installation. Thus, the communication between devices preferably takes place bidirectionally, as represented by a double arrow 31. For example, the first control device sends a deployment command to the second actuator. It receives a first signal notifying it that the command has indeed been received. It then receives a second signal notifying it that the command has indeed been executed. These signals provoke specific displays on the first human-machine interface.

However, the communication between some devices may also be handled unidirectionally by indicating the addressee, as represented by a broken line arrow 32. This type of communication excludes a return signal.

Furthermore, the communication between some devices may be handled by unidirectional broadcasting, with no particular addressee indicated. In particular, the wind safety sensor, although equipped with bidirectional communication means, communicates in unidirectional broadcast mode upon the transmission of safety commands following a threshold overshoot. This unidirectional communication mode is also used in a pairing procedure during which an actuator set to a particular state learns that it must obey commands sent by the safety sensor.

Without it having to be represented in the figure, it is understood that each device has an identifier ID that is specific to it, and that all the devices share an authentication key, or "house key", that is common to all the elements of the installation.

Figure 2:
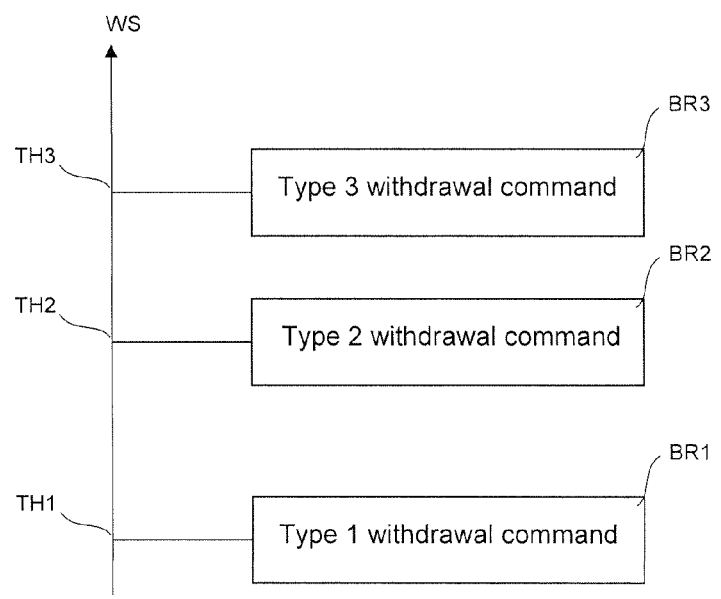
FIG. 2 describes in graphic form a method of operating the wind safety sensor.

FIG. 2 describes, in the form of a graph whose vertical axis represents the wind speed WS, a method of operating the wind safety sensor. A number of thresholds have been stored in the sensor and a number of groups of actuators have been defined by the installer, for example a first group, a second group and a third group. Each group is tagged with a group identifier. The safety sensor comprises a table 41 containing threshold values and also group identifiers. A first threshold TH1 provokes, when exceeded above, the broadcast transmission of a signal BR1 comprising the identifier of the first group. The overshooting of a second threshold TH2 provokes, when exceeded above, the broadcast transmission of a signal BR2 comprising the identifier of the second group. The overshooting of a third threshold TH3 provokes, when exceeded above, the broadcast transmission of a signal BR3 comprising the identifier of the third group. Each transmitted signal comprises a withdrawal command, so as to set all the mobile elements of the group concerned to a safety position.

Figures 3, 4, 5:
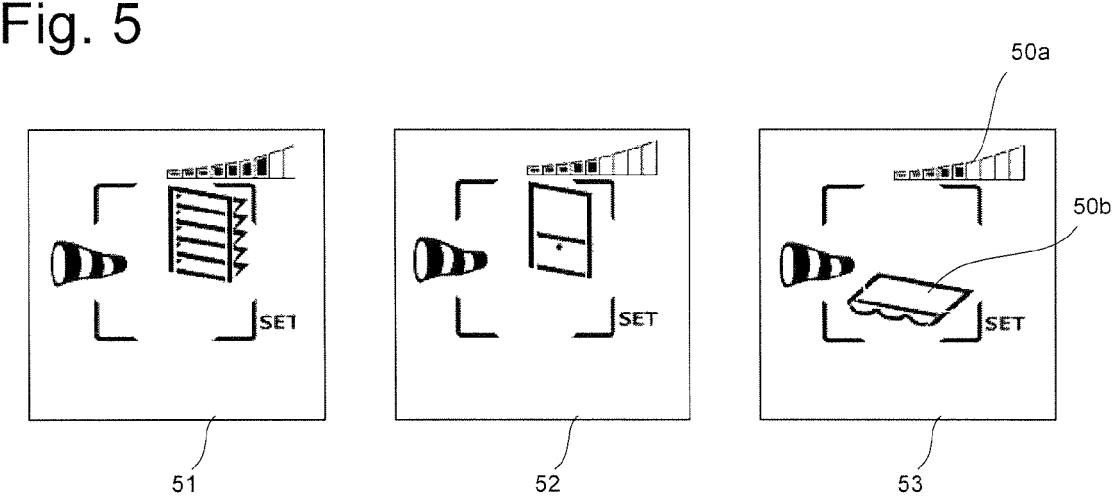
FIG. 3 represents modes for setting and assigning thresholds and groups in the wind safety sensor.
FIG. 4 represents a table for assigning thresholds and safety commands to different types of mobile elements.
FIG. 5 represents 3 configurations of a human-machine interface means housed in a control device that can be used to set thresholds for each type of mobile elements.

FIG. 3 generally represents four modes for setting and assigning thresholds and groups (designated Case 1 to Case 4) in the wind safety sensor. Depending on the case used, each group may be predefined or defined by the installer. Similarly, the threshold assigned to a group may be predefined or defined by the installer.

A default threshold is an example of a predefined threshold. The wind safety sensor's manufacturer provides a safety threshold of his choice that is low enough to effectively protect any type of mobile solar protection element. This threshold is prestored in the sensor.

According to the invention, a group is predefined by a type of mobile elements. For example, the mobile elements of the type with orientable and stackable slats define a first type (Type 1), the mobile elements which are of the windable screen type with vertical movement define a second type (Type 2) and the mobile elements which are of the windable blind type with horizontal movement component, define a third type (Type 3). Thus, the external venetian blinds belong to Type 1, the external screens belong to Type 2, the awnings (or terrace blinds) belong to the Type 3.

Each of these three types has a corresponding different wind sensitivity, and therefore a particular threshold requirement.

Thus, the possibility of assigning thresholds, in the safety sensor, to a type of mobile element, and not to a particular mobile element actuator, is a particularly effective factor in saving time and eliminating the risks of incorrect settings.

In the table of FIG. 3, by far the most interesting cases permitted by the information are the third case (indicated in bold characters) and above all the fourth case (indicated in bold characters and surrounded by a thick line).

The third case (Case C3) is that of a group predefined in the sensor by the type of mobile equipment as indicated previously, with a predefined wind threshold for each group. Thus, a first default threshold corresponds to any mobile element of the type with orientable and stackable slats, a second default threshold corresponds to any mobile element of the windable screen type with vertical movement and a third default threshold corresponds to any element of the windable blind type with horizontal movement component. Apart from a necessary operation to pair the safety sensor with the different actuators, the installer has absolutely no operation to carry out if each actuator of the installation knows the type of mobile element to which it is connected, as will be detailed in relation to FIG. 6.

The fourth case (Case C4) is that of a predefined group as previously, with a wind threshold that can be set for the whole of each group, therefore for each type of mobile equipment. Thus, in a single operation, the installer can adjust the threshold relating to all the mobile elements of windable screen type with vertical movement, for example by increasing the threshold if he has found that the products used in this installation are particularly insensitive to the wind. If sun and wind are simultaneously present, this setting of a higher threshold gives the occupants of the building the benefit a longer solar protection time.

As explained below, the various actuators should be distributed according to the types predefined in the safety sensor.

FIG. 4 represents a table 41 for assigning thresholds and safety commands to different types of mobile elements. The table 41 is contained in memory in the wind safety sensor. In FIG. 4, it corresponds to the case of predefined groups, each group relating to a type of mobile elements. The table correlates a type identifier with the corresponding threshold. In the preferred embodiment, the table comprises at least one sub-level for assigning distinct control codes to distinct thresholds, for one and the same group of mobile home automation elements. Thus, for the elements of the first type (with orientable and stackable slats, designated EVB), a low safety threshold TH1a and a high safety threshold TH1b are provided. An upward overshoot of the low threshold provokes the transmission of a low safety command CMD(HOR) consisting simply of an order to orient the slats horizontally. Thus, the mobile element becomes much less sensitive to the wind, while continuing to provide a certain solar protection effectiveness. An upward overshoot of the high threshold provokes the transmission of a withdrawal command CMD(UP). For the elements of the second type (windable screen with vertical movement, designated SCR), a single second threshold TH2 is provided, the upward overshooting of which provokes the transmission of the withdrawal command CMD(UP). For the elements of the third type (windable blind with horizontal movement component, designated AWN), a single third threshold TH3 is provided, the upward overshooting of which provokes the transmission of the withdrawal command CMD (UP). Alternatively, different safety commands are transmitted according to the types. Similarly, the second type and the third type may be the subject of sublevels assignments, with two thresholds (or even more) for each type, by differentiating the commands relating to each threshold.

FIG. 5 represents 3 partial configurations of the human-machine interface means housed in a control device that can be used to set thresholds for each type of mobile elements. A first configuration 51 corresponds to the display of a threshold setting mode relating to the mobile elements of the first type. A second configuration 52 corresponds to the display of a threshold setting mode relating to the mobile elements of the second type. A third configuration 53 corresponds to the display of a threshold setting mode relating to the mobile elements of the third type. The display comprises at least one indicator 50a displaying the wind threshold, for example in the form of a bar graph, and a pictogram 50b representative of the type of mobile element to which the current setting applies. For example, this partial configuration appears on the screen of the human-machine interface 21a whereas the keys of the keyboard of the interface are used to switch from one configuration to the other or enable the displayed threshold to be adjusted. A confirmation key is used to store the desired value.

Thus, the human-machine interface is capable of differentiating at least one first setting relating to a mobile home automation element of first type, a second setting relating to a mobile home automation element of second type, and a third setting relating to a mobile home automation element of third type.

Figure 6:
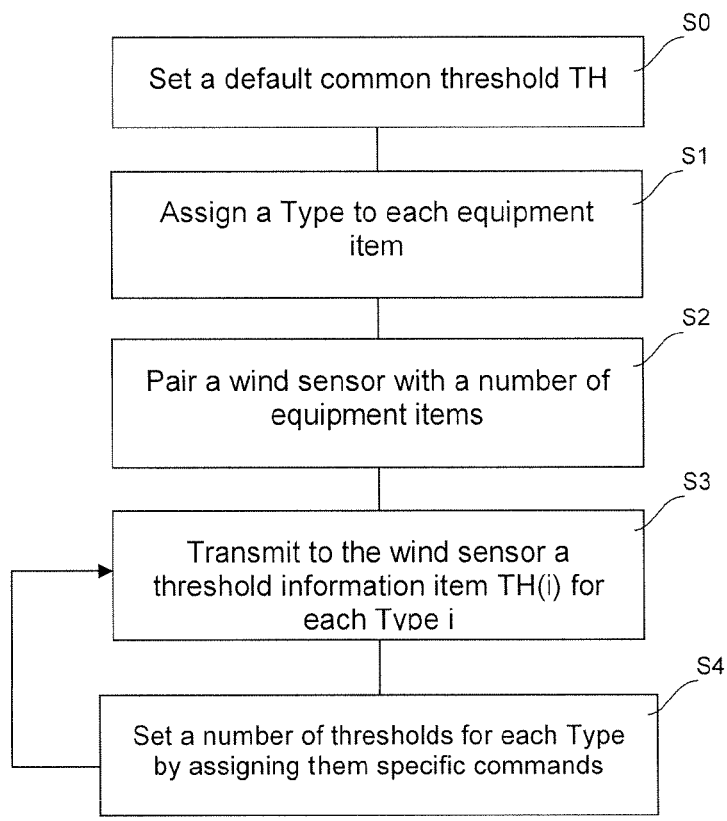
FIG. 6 represents an initialization method for the installation.

FIG. 6 represents a method of initializing the installation.

In a preliminary step S0, the manufacturer sets the default threshold, as explained above. This default threshold may, nevertheless, be modified by the installer, by acting on a manual means.

In a first step S1, a type is assigned to each equipment item. Preferably, the type is stored in each actuator connected to a mobile element, for example by indicating to it that it is of type 1, type 2 or type 3. This operation is normally carried out by the manufacturer of motorized mobile elements, who has tools enabling him to store data in the memory of an actuator. Otherwise, the installer may carry out this type assignment operation. Independently of its use in the context of the invention, the knowledge of an equipment type is very useful for example for the control devices which can thus adapt their control ergonomics to the specifics of the equipment. Thus, an actuator of a mobile element with orientable slats will be controlled both by specific orientation commands and by withdrawal or deployment commands, whereas an actuator of a windable screen with vertical movement will be controlled only by withdrawal or deployment commands.

In many cases, the type is stored in the actuator by the manufacturer of the actuator, this actuator being specific to a determined type of mobile element. In these cases, neither the manufacturer of the motorized mobile element, who incorporates the actuator in his product, nor the installer have to concern themselves with this assignment operation.

The assignment of a threshold to a type of mobile elements overwrites the default threshold value for this type of mobile elements.

In a second step S2, the wind safety sensor 24 is paired with each equipment item that will have to react to any command transmitted by the sensor and containing its type identifier.

Step S2 is unnecessary if the installation comprises only one wind safety sensor, and it is accepted that any actuator of the installation must obey a command originating from a safety sensor that can be identified as belonging to the home automation network 30. However, provision is made for the installation to be able to comprise a number of wind safety sensors (for example one sensor for each exposed facade). In this case, it is preferable for each sensor to be paired separately with all the actuators of the relevant facade. Pairing the sensor consists in placing an actuator in a pairing mode, for example using the first control device, already known to the actuator, and in provoking the transmission of the pairing command by the safety sensor. Only the actuator placed in pairing mode stores the identifier of the sensor, hereinafter denoted ID WS. The operation is repeated as many times as there are actuators to be paired with the sensor.

Alternatively, the pairing operations are carried out via the second control device and by using bidirectional communications between this device, the safety sensor and the actuators.

In a third step S3, information is transmitted to the wind safety sensor containing the threshold TH assigned to each type, or particular to each type, doing so in order to complete or update the table 41. Since the safety sensor is preferably standalone, the useful information that will be contained in the table 41 is previously duplicated in a first buffer memory 42 or in a second buffer memory 43 or even in a third buffer memory 44.

The first buffer memory 42 belongs to the second control device 22, whose radio means are permanently powered. When the installer adjusts the setting thresholds and/or defines the types for the safety sensor 24, using the interface 22a, he in fact acts on the content of the first buffer memory because the safety sensor is not in permanent radio listening mode. Only when the sensor switches to the active radio phase does it interrogate the second control device to ascertain in particular whether the buffer memory has been modified. If it has, the information is transmitted from the buffer memory to the safety sensor and it is stored in the table 41.

Alternatively, the content of the buffer memory is systematically transmitted upon each interrogation.

If the setting is made using the first control device 21, then the second buffer memory 43 is used. The latter is housed in the relay device 23. When the installer adjusts the setting thresholds and/or defines the types for the safety sensor 24, using the interface 21a, he in fact acts on the content of the second buffer memory 43. For the remainder, the transmission takes place as in the case of the first buffer memory.

The third buffer memory 44 is housed in the fourth actuator 17 and can be used in the same way as the second buffer memory to perform a setting of the thresholds from the first control device, which avoids having to use a specific relay device.

If appropriate, the table makes it possible, for one and the same type, to assign a number of thresholds by assigning a specific command to each threshold, which is the object of the fourth step S4 of the initialization method. There is thus a sublevel for assigning distinct control codes to distinct thresholds, for one and the same type of mobile home automation elements.

Figure 7:
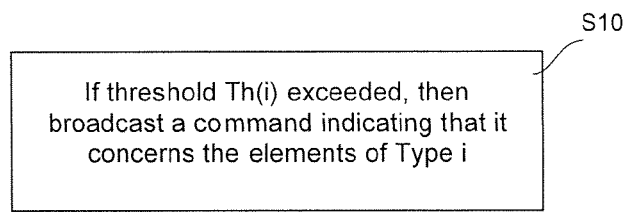
FIG. 7 describes, in the form of a flow diagram step, the operating method according to the invention.

FIG. 7 describes, in the form of a single step S10, the operating method of the sensor according to the invention. In this step, a test is carried out by the sensor to check whether one of the stored thresholds has been exceeded. In this case, a safety command is broadcast, indicating that this command concerns the elements whose type is that which corresponds to the threshold.

Figure 8:
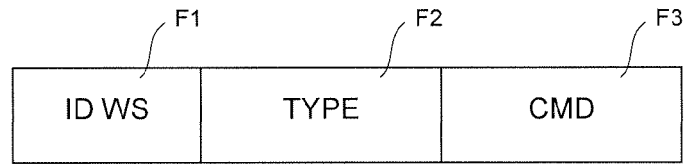
FIG. 8 describes a transmission frame sent by the wind safety sensor.

FIG. 8 describes a transmission frame sent by the wind safety sensor when a threshold has been exceeded. The transmission frame contains at least one first block F1 identifying the sensor, for example the identifier of the sensor ID WS and/or information such as a "house key" making it possible to check that the sensor belongs to the network, a second block F2 containing a type identifier, the type being that whose threshold has been exceeded, and a third block F3 containing the code of the safety command to be carried out. This frame is transmitted in the form of a unidirectional broadcast. It is repeated a number of times so as to obviate any interference during the broadcast.

The coding of the type identifier in the block F2 within the frame is preferably such that a number of types can be addressed simultaneously. For example, if the block F2 is coded on one byte and provision is made for the safety sensor to be able to manage up to 4 different types of mobile elements, each type will be coded by two bits. The byte F2 may then simultaneously contain all 4 identifiers, or just three of them, or two of them, or finally just one of the type identifiers. This coding method is particularly useful when one and the same threshold is assigned to two (or more) distinct types of mobile elements.

In a simplified embodiment, there is only one safety command, common to all the actuators, for example a total withdrawal command. In this case, the third block F3 is unnecessary since each actuator knows which type of command to execute upon receipt of a message broadcast by the safety sensor. The identifier of the safety sensor defining it as safety sensor WS is then sufficient to define the safety command.

However, as in the prior art, the sensor may also notify the devices that the wind has dropped, in order to allow new deployment commands. Preferably, a broadcast of this information takes place upon the downward crossing of a predetermined calm wind threshold that is common to all the types. This information is not a safety command and does not generate any safety action: on the contrary, it cancels or disables a prevention of deployment stored in the devices following the receipt of a signal relating to a safety command.

In order to preserve the energy independence of the safety sensor, it is also possible for the safety command to be transmitted point-to-point by the sensor to a relay device rather than broadcast directly by the sensor. It is then the relay device that broadcasts the safety command.

Figure 9:
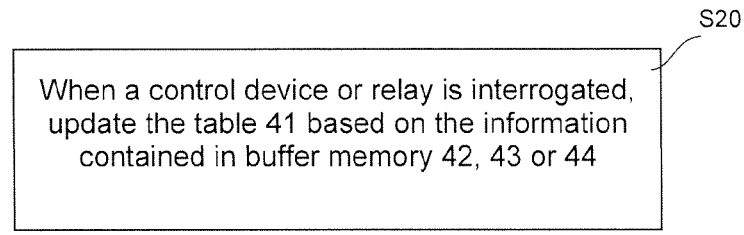
FIG. 9 represents a program for updating the assignment table.

FIG. 9 represents, in a single step S20, a program for updating the assignment table. This step is activated by the safety sensor when it communicates bidirectionally with a device comprising a buffer memory 42, 43 or 44. In the step S20, the content of the buffer memory is transferred to the sensor and stored in the assignment table 41 contained in a memory of the sensor.

In order to address the use of installation practices, the wind sensor also comprises a manual threshold adjustment means 24c, for example a potentiometer with wiper. When this means is activated by the installer, one and the same threshold set by this manual means and tagged by the position of the cursor on a scale is assigned to all the types of mobile elements.

In other words, this manual operation is sufficient to erase all the previously stored thresholds, and can constitute a simple means of returning all the equipment items to one and the same state with regard to wind thresholds.

The invention claimed is:

1. A wind safety sensor designed to protect mobile home automation elements, comprising a physical device for measuring at least one parameter associated with the action of the wind, comprising a radiofrequency communication means capable of transmitting a signal when the parameter exceeds a threshold, which comprises an assignment table for at least one first threshold and one second threshold relating to distinct types of mobile home automation elements, and wherein the transmitted signal comprises an identifier of the type for which the threshold has been exceeded, and an information selected from the group of, a code controlling a safety action and an identifier of the safety sensor and combinations thereof, said transmitted signal broadcasting a safety command, indicating that this command concerns the elements whose type is that which corresponds to the threshold.

2. The wind safety sensor as claimed in claim 1, wherein the type identifier can take at least one first predefined value, relating to a mobile home automation element of the type with orientable and stackable slats, a second predefined value, relating to a mobile home automation element of the windable screen type with vertical movement, and a third predefined value relating to a mobile home automation element of the windable blind type with horizontal movement component.

3. The wind safety sensor as claimed in claim 2, wherein the assignment table comprises at least one sublevel for assigning distinct control codes to distinct thresholds, for one and the same type of mobile home automation elements.

4. The wind safety sensor as claimed in claim 1, wherein the communication means is bidirectional.

5. The wind safety sensor as claimed in claim 1, which comprises a program for updating the assignment table and wherein one and the same default threshold is assigned to all the types of mobile home automation elements until a first update has been made.

6. The wind safety sensor as claimed in claim 1, which comprises a manual threshold adjustment means and wherein one and the same threshold set by this manual adjustment means is assigned to all the types of mobile home automation elements when it is activated.

7. The wind safety sensor as claimed in claim 1, which comprises a standalone power supply means such as a primary battery or an accumulator battery recharged by a photovoltaic panel.

8. A home automation installation comprising at least one wind safety sensor as claimed in claim 1 and at least one home automation device, connected to the AC mains, wherein this home automation device comprises a bidirectional radiofrequency communication means and comprises a buffer memory capable of containing assignment table threshold values, transmitted to the safety sensor when interrogated by the safety sensor.

9. The home automation installation as claimed in claim 8, wherein the threshold values are adjusted and stored in the buffer memory using a human-machine interface means of a control device of the installation.

10. The home automation installation as claimed in claim 8, which comprises actuators driving mobile elements, each actuator being provided with bidirectional communication means and able to receive and execute:

a command to pair with the safety sensor a command to store a type identifier a movement command containing the identifier of the actuator a movement command containing the type identifier.

11. A control device for a home automation installation comprising a wind safety sensor as claimed in claim 3, which comprises a human-machine interface means able to differentiate at least one first setting relating to a mobile home automation element of the type with orientable and stackable slats, a second setting relating to a mobile home automation element of the windable screen type with vertical movement, and a third getting relating to a mobile home automation element of the windable blind type with horizontal movement component.

\* \* \* \* \*